United States Patent [19]

Vercammen et al.

[11] Patent Number: 5,745,235

[45] Date of Patent: Apr. 28, 1998

[54] MEASURING SYSTEM FOR TESTING THE POSITION OF A VEHICLE AND SENSING DEVICE THEREFORE

[75] Inventors: Jan Maria Ludovicus Vercammen, Antwerpen; Walter Maria Alfons De Feyter, Schilde, both of Belgium

[73] Assignee: Egemin Naamloze Vennootschap, Schoten, Belgium

[21] Appl. No.: 824,742

[22] Filed: Mar. 26, 1997

[30] Foreign Application Priority Data

Mar. 26, 1996 [BE] Belgium ................. 09600271

[51] Int. Cl.⁶ ................................................ G01B 11/00
[52] U.S. Cl. ................................... 356/375; 356/141
[58] Field of Search .................................. 356/372, 373, 356/375, 385, 138, 139, 140, 141

[56] References Cited

U.S. PATENT DOCUMENTS 4,328,545  5/1982  Halsall et al. ............... 356/141.4

FOREIGN PATENT DOCUMENTS

| 265 542 | 5/1988 | European Pat. Off. . |
| 363 339 | 10/1988 | European Pat. Off. . |
| WO 87/06353 | 10/1987 | WIPO . |

Primary Examiner—David C. Nelms
Assistant Examiner—Robert Kim
Attorney, Agent, or Firm—Bacon & Thomas

[57] ABSTRACT

A measuring system for testing the position of a vehicle (1) includes a number of optical beacons (6 and 7), a sensing device (10) which is mounted on the vehicle (1) and which generates a position signal when sensing light reflected from a beacon (65 or 7), and a computer processing unit (14) for calculating, starting from the information received from the sensing device (10), the deviation of the vehicle relative to the desired position and driving direction of the vehicle. The sensing device (10) includes two cameras which are mounted on the vehicle, namely, a first camera which is directed approximately along the driving direction, and a second camera which is directed along a direction vertically upward or downward relative to the plane including the path of travel of the vehicle. At least one of the beacons (6) is placed in such a way that, during the motion of the vehicle approximately along the desires path, the beacon can be seen by the sensing device (10) along the driving direction of the vehicle. At least another one of the beacons (7) is positioned along the desired path, but is observable in the direction above or below the aforementioned plane of the path, and is situated above or below the sensing device (10), depending whether the second camera is directed upwards or downwards relative to the plane of the path or travel, each camera may include its own light projector.

7 Claims, 4 Drawing Sheets

MEASURING SYSTEM FOR TESTING THE POSITION OF A VEHICLE AND SENSING DEVICE THEREFORE

BACKGROUND OF THE INVENTION

1. Field of the Invention

This invention relates to a measuring system for testing the actual position of a vehicle, particularly a driverless computer guided vehicle which, by means of a control system, is steered through an area according to a well-defined path, in respect to the desired displacement of the vehicle.

2. Discussion of Related Art

Such measuring systems comprise, for example, sensors which are placed on the vehicle and emit internal signals from which a processing unit can determine the actual position of the vehicle. By means of comparison with input information concerning the desired path, the control system can steer the vehicle according to this desired path.

The aforementioned measuring system, however, is not sufficiently precise because each new position is calculated relative to a previous one and, thus, all positions are in fact determined starting from a single known position. After a period of time, large deviations with respect to the desired path may occur.

There are known measuring systems which allow one to determine a position by means of external information.

Such a measuring system is described in European Published Application No. 0.185.816. This measuring system comprises a number of beacons, formed by reflectors, using an optical code, and which are installed in the area at the level or elevation of the sensing device. A sensing device, mounted at the vehicle, includes a rotating laser scanner. A processing unit determines, starting with the laser light that is reflected by two reflectors, the actual position of the vehicle by means of triangulation.

Starting from this known actual position and a known desired position, a control device can steer the vehicle to the desired position.

Due to the use of a rotating laser beam source, the sensing unit is expensive and undergoes wear and tear. The processing unit uses triangulation in order to calculate the actual position, and the beacons must be provided with a code. All this renders the measuring system complicated.

Furthermore, the orientation of the vehicle is not actually measured, but is only calculated, starting from position determinations.

BRIEF SUMMARY OF THE INVENTION

This invention provides a measuring system for testing the position of a vehicle which does not have the aforementioned and other disadvantages and enables an accurate determination of the deviation of the vehicle from the desired path, but which, however, is simple and does not comprise rotating parts.

This objective is achieved according to the invention by a measuring system for testing the position of a vehicle, which measuring system comprises a number of optical beacons; a sensing device which is mounted on the vehicle in order to emit a signal when sensing a beacon; and a processing unit that calculates starting with the information from the sensing device, the deviation in respect to the desired position and driving direction of the vehicle. The sensing device comprises two cameras which are mounted on the vehicle, namely, a first camera which is directed approximately along the driving direction, and a second camera which is directed along a direction standing upright vertically from a plane including the path of travel of the vehicle. At least one of the beacons is placed in such a way that, during the motion of the vehicle almost along to the desired path, the beacon can be seen by the sensing device in the driving direction of the vehicle. At least one other beacon is also located along the desired path, but seen in a direction standing upright from the aforementioned plane of the path, and which is situated higher or lower than the sensing device, depending whether the second camera is directed upwards or downwards in respect to this plane of the path of travel.

With the information from the processing unit, the control system can steer the vehicle according to the desired path.

The application of this measuring system can be temporary; for example, every time when a control element, such as with a prior art conventional measuring system using sensors placed upon the vehicle, does not work, or in order to provide an additional control from time to time and to eliminate deviations from the desired path which are caused by the inaccuracy of the conventional measuring system.

Thus, the control system can also comprise a conventional measuring system, mounted on the vehicle, with conventional measuring apparatus such as pulse generators and potentiometer. The processing unit of this conventional measuring system can simultaneously be a part of the measuring system according to the invention. In this case, the common processing unit, either simultaneously or subsequently, can use information from the sensing device and information from the conventional measuring apparatus in order to calculate the deviation of the vehicle from the desired path.

Preferably, the cameras are of the so-called "random access" type.

The beacons can be reflectors.

In this system, in order to exclude disturbances from environmental light, a light source to which the cameras are sensitive can be used for each camera.

The invention also may use a sensing device, either coupled to a processing unit or not, which may be used in the measuring system according to the invention.

BRIEF DESCRIPTION OF THE DRAWINGS

With the intention to better show the characteristics of the invention, in the following, as an example without any limitative character, a preferred form of embodiment of a measuring system and of a sensing device according to the invention is described, with reference to the accompanying drawings, wherein.

DETAILED DESCRIPTION OF THE PREFERRED EMBODIMENTS OF THE INVENTION

Figure 1:
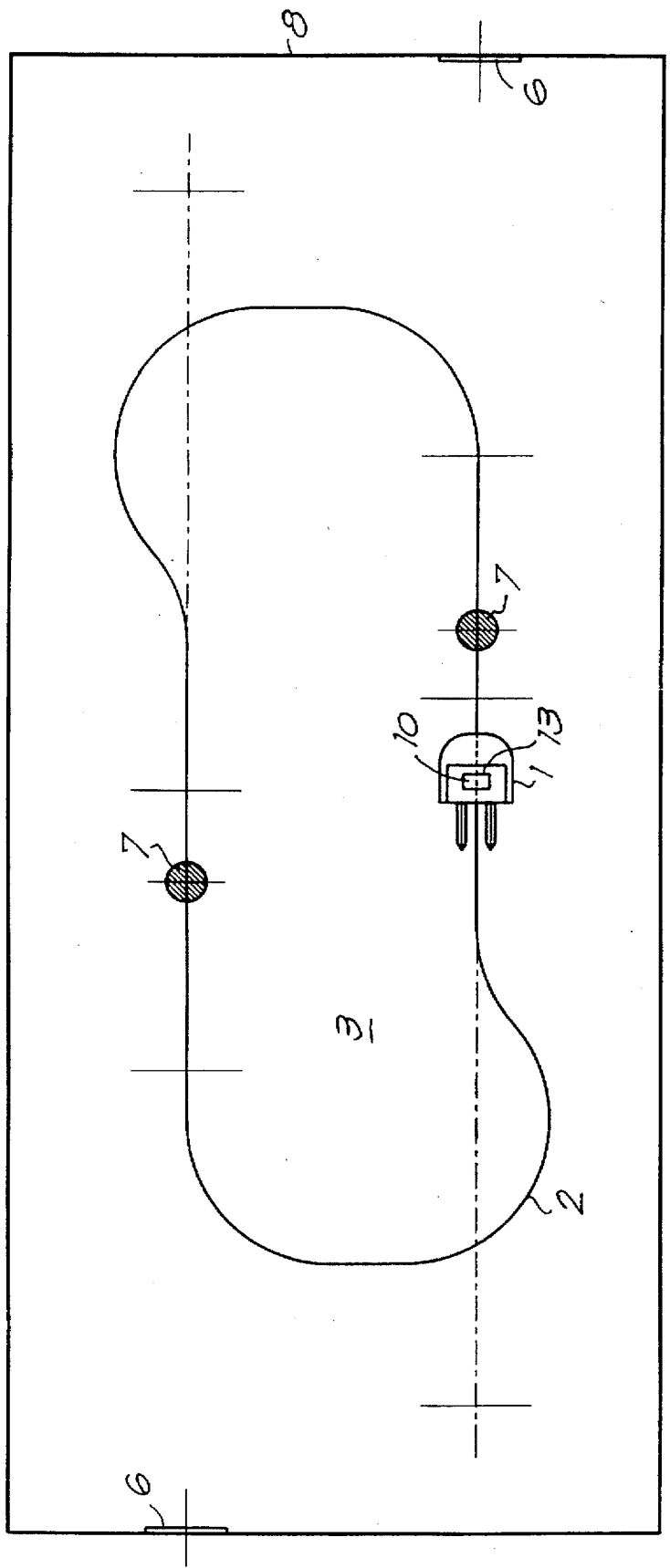
FIG. 1 schematically shows a path with a vehicle, provided with a measuring system according to the invention.
Figure 2:
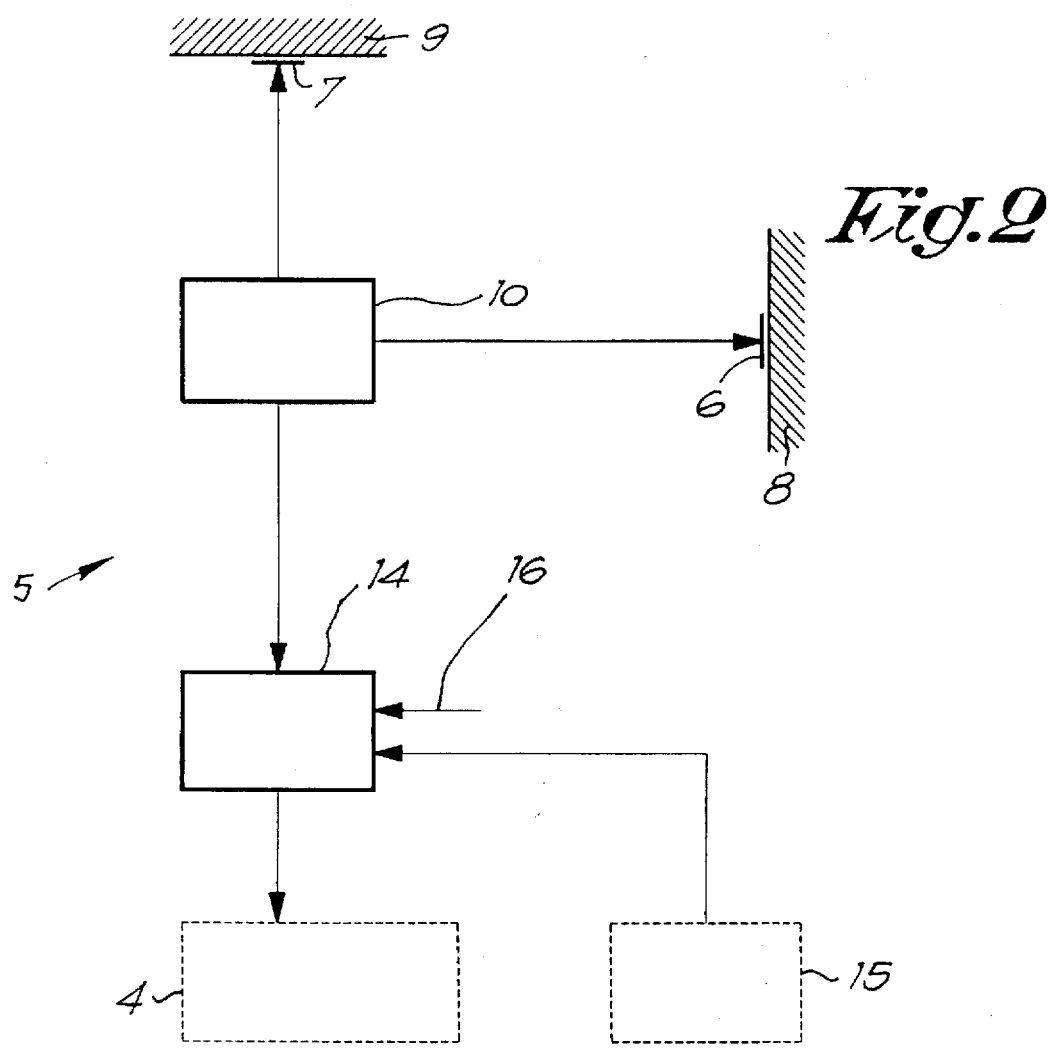
FIG. 2 shows a block diagram of the measuring system of FIG. 1.

As shown in FIGS. 1 and 2, a driverless vehicle 1 is steered according to a well-defined predetermined path 2 through an environment 3, for example, a warehouse, by means of a known and not further described herein control device 4 which receives signals from a measuring system 5 which, according to the invention, comprises a number of optical beacons 6 and 7, namely, one or more beacons 6 which are attached upon a support extending up from the plane of the path, and one or more beacons 7 which are mounted on a support extending approximately parallel to the plane of the path and which are situated level with or above the path.

The plane including the path is the plane in which the path, which is followed by the vehicle 1, extends, or in other words, the driving plane wherein the driving directions of the vehicle during the following of this path are situated. Due to the steering, the path which is actually followed by vehicle 1 almost conforms with the desired path 2. The desired path 2 and the actual path are situated in the same plane.

In case that the area 3 is a warehouse, as in the shown in this example, the aforementioned plane of the path 2 extends parallel to the floor. The support for a beacon 6 can then be formed by a wall 8 of the warehouse, whereas the support for a beacon 7 can be formed by the aforementioned floor or the ceiling 9.

In the example shown in the FIGS. 1 and 2, the measuring system 5 comprises two beacons 6 which respectively are attached at two opposite walls 8, at imaginary intersections of extensions of portions of path 2 with such walls, and two beacons 7 which are attached at the ceiling 9 of the warehouse.

These beacons 6 and 7 are flat or planar reflectors which extend with their reflective faces parallel to the support upon which they are attached. They are, for example, round and white.

Figure 7:
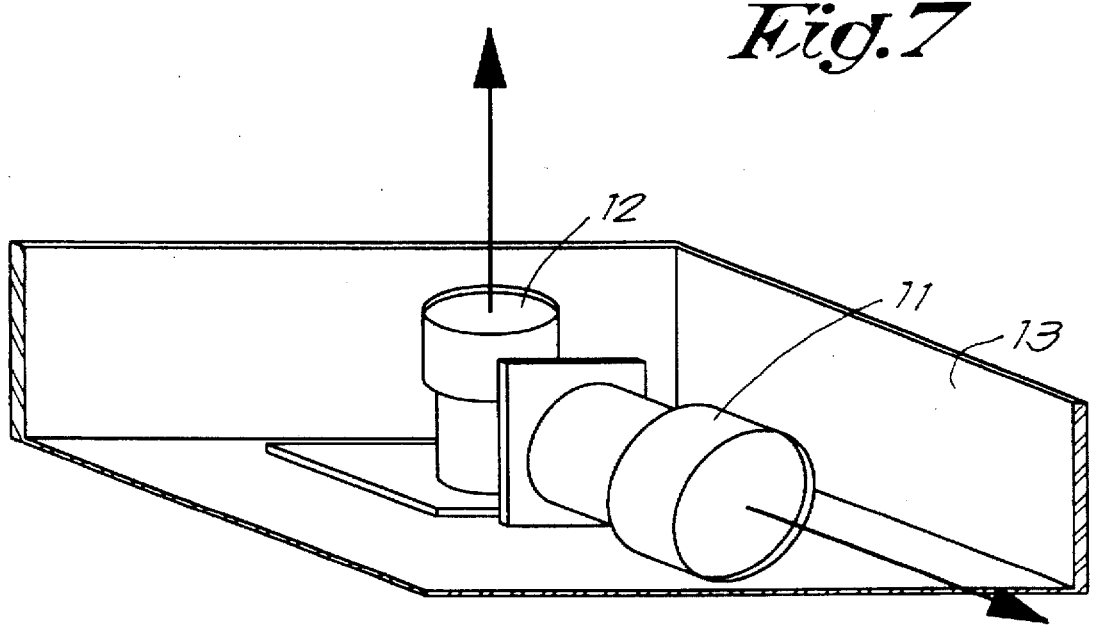
FIG. 7 shows a perspective view of the sensing device of the measuring system of FIG. 1.

The measuring system 5 further comprises a sensing device 10 cooperating with these beacons 6 and 7 which, as shown in detail in FIG. 7, comprises two cameras 11 and 12.

Both cameras 11 and 12 are preferably mounted in a fixed manner in respect to each other and stationary on the vehicle 1.

The first camera 11 is directed along the driving direction of the vehicle 1 and, thus, in the example, is directed virtually horizontally. This driving direction is the direction of the vector of the translation speed of the vehicle.

The aforementioned beacons 6 are placed virtually at the level of this camera 11.

The second camera 12 is directed in a direction standing upright relative to the plane of the path 2. In this example, the camera 12 is directed perpendicular to the floor and the ceiling 9, or virtually vertical and directed upwards. This direction coincides with the vector of the rotation speed of the vehicle 1.

Figure 6:
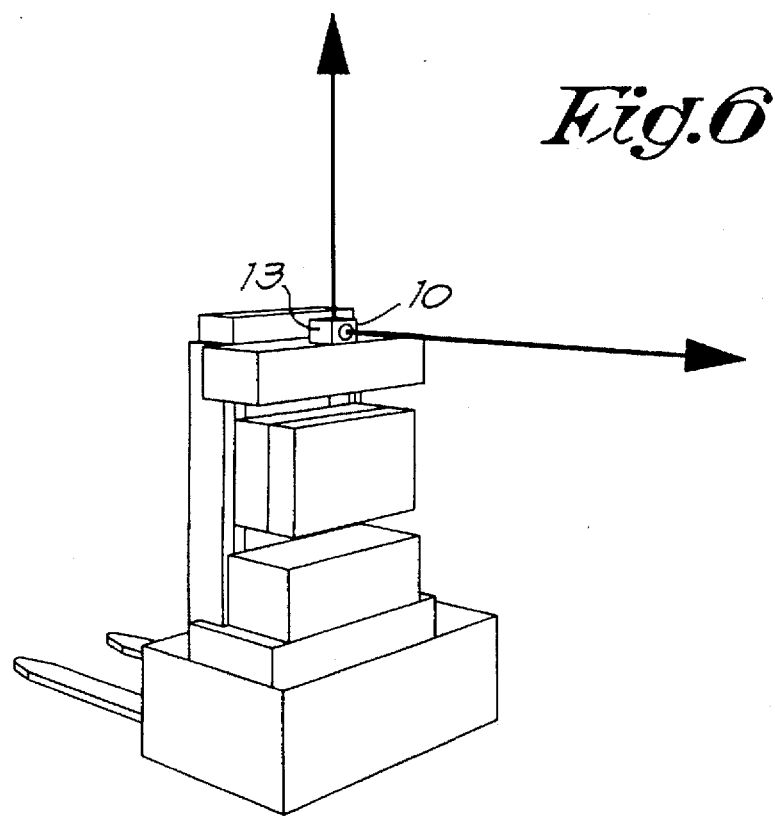
FIG. 6 shows a perspective view of the vehicle of FIG. 3.

The direction of the cameras is indicated by arrows in the FIGS. 6 and 7.

Each of the cameras 11 and 12 is electronic and includes, in this example, an image receptor, a lens and an infrared light source for projecting infrared light rays.

The image receptor preferably is pixel-addressable or, in other words, a so-called "random access" image receptor with, for example, 512×512 pixels, a frequency of 6 Mhz in the X-direction and a frequency of 500 kHz in the Y-direction.

The lens of the camera 11 preferably is a zoom lens whereas the lens of the camera 12 has a fixed focal distance.

The infrared light source is, for example, an LED corona with a wavelength of 880 nm around the image receptor.

The two cameras 11 and 12 are placed in a housing 13 which is attached on the vehicle 1 and of which the front and the top (i.e. along the camera line of sight), which are left out in FIG. 7, are manufactured from infrared-transmittent plexiglass. The plexiglass not only forms a protection for the cameras, but is also a filter which blocks the major part of the ambient visible light.

By means of this housing, fogging of the lenses of cameras 11 and 12 also is prevented when the vehicle 1 suddenly leaves a cold zone.

Finally, the measuring system 5 comprises a processing unit 14 which is connected to the sensing device 10 and which is constituted of a computer, provided with the appropriate software.

In a manner which will be described below, this processing unit 14 is able to calculate, from the image information from cameras 11 and 12, the deviation in position and driving direction of vehicle 1 in respect to the desired path.

The processing unit 14 also is part of a conventional measuring system with measuring apparatus 15 which is mounted on the vehicle 1 and which also can deliver internal information from which the processing unit can calculate the actual position and driving direction of the vehicle 1 in respect to the desired ones. This measuring apparatus comprises well-known sensors, not shown in the figures, which are mounted on the vehicle 1, for example, a directional gyroscope and a pulse generator or encoder, mounted on the wheels, and a potentiometer, mounted on the steering wheel, for sensing wheel position.

In order to be able to steer with this measuring apparatus 15, the computer includes a memory wherein information, in FIG. 2 indicated by arrow 16, related to the path 2 to be followed can be stored.

The vehicle 1 may be a fork lift truck, such as shown in detail in FIG. 6. The term "vehicle", however, has to be understood in a broad sense in this patent application. This vehicle may also be a self-driving transport carriage, for goods as well as for persons, a crane or even a manipulator of a robot or the like. This vehicle, of course, has to be steerable and, thus, must be provided with a steering device which can be operated by the aforementioned control device 4 in order to change the driving direction.

The function of the measuring system 5 according to the invention is simple and as follows.

A vehicle 1 which is located on the path 2 is normally guided by the intermediary of the control device 4 by the processing unit 14 which, in a well-known manner, from the information of the conventional measuring apparatus 15, although with a limited accuracy, calculates the actual position and the driving direction of the vehicle 1 and compares them with the desired position and driving direction derived from the information which is stored in the memory of the processing unit 14.

When one of the cameras 11 and 12 or both sense a beacon 7 or 8, then the measuring system 5 works with information from sensing device 10.

Figure 3:
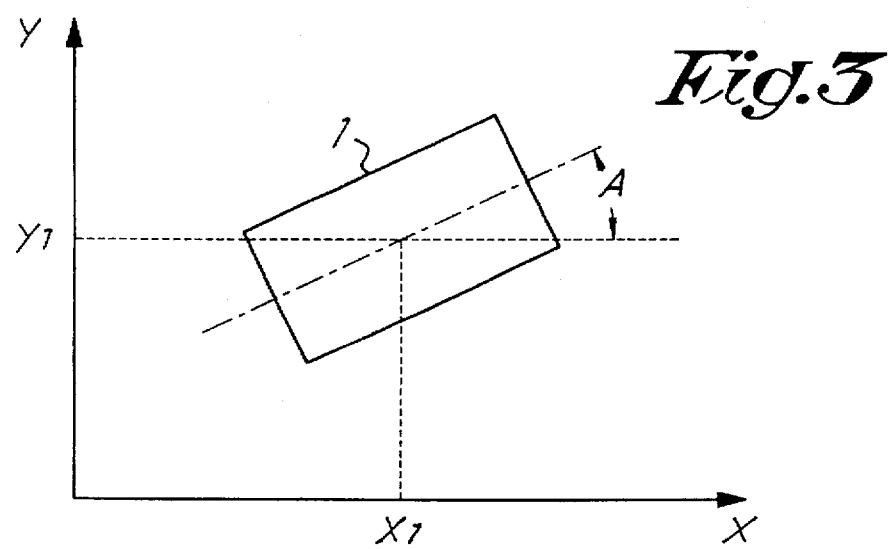
FIG. 3 schematically shows a top view of the vehicle of FIG. 1.

As represented in FIG. 3, in a Cartesian axis system showing the area 3, the deviation of the vehicle 1 from the desired path can be shown by means of the X,Y coordinates of the position and the angle A of the driving direction, respectively.

By means of the camera 11 and a beacon 6, the angle A is determined as follows.

Figure 4:
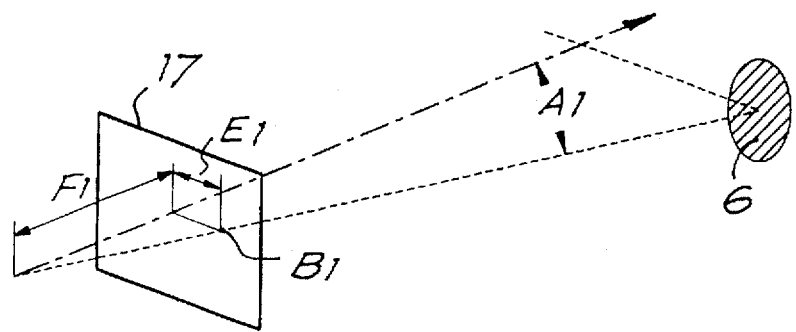
FIGS. 4 and 5 schematically and in perspective show the sensing by the respective two cameras of the measuring system of FIG. 1.

The infrared light rays or beam emitted by camera 11 strike and are reflected by the beacon 6 and fall on point B, of the image field 17 of the camera 11, as shown in FIG. 4.

By reading the image field 17, the number of columns $E_1$ is measured between point $B_1$ and the central column of the image field 17 that coincides with the actual driving direction.

By means of the processing unit 14, the angle $A_1$ between the direction of the beacon 6 and the driving direction is calculated according to the equation: arc tangent $(E_1.P/F_1)$, whereby P is the physical dimension of a pixel and $F_1$ the distance between the image field and the focal point of camera 11.

Starting from this angle $A_1$, the deviation from the driving direction in respect to the desired path 2 is calculated. The angle A also can be determined in the aforementioned X,Y-axis system.

By means of the camera 12 and a beacon 7, the deviation of the vehicle position transversely of the driving direction is determined as follows. This can take place either simultaneously with the determination of the orientation of the vehicle or not.

Figure 5:
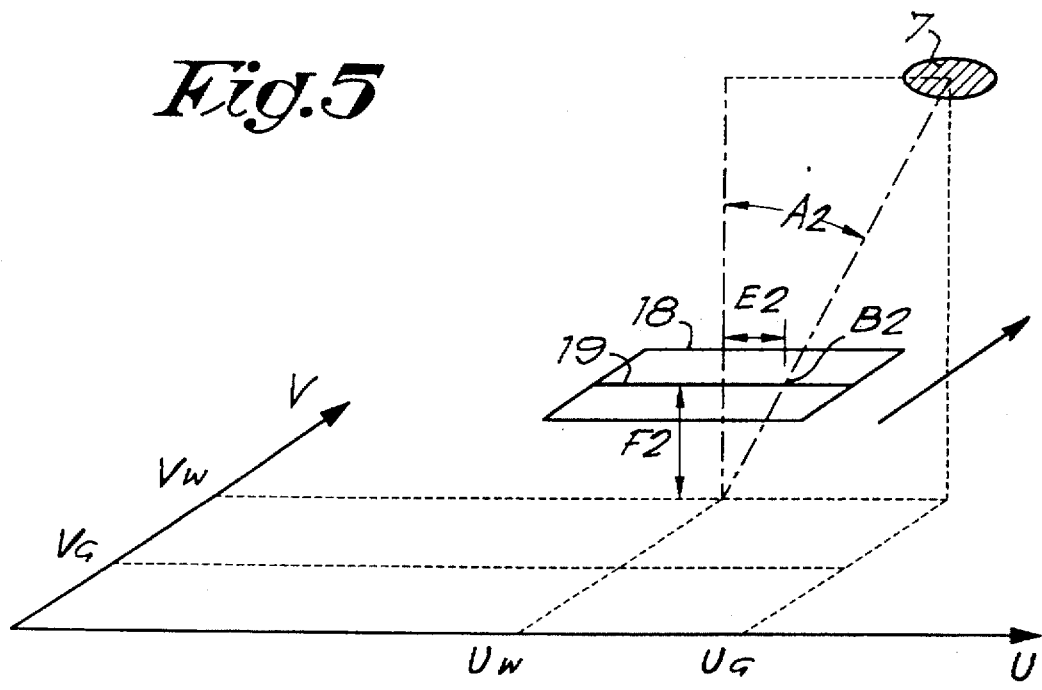

As seen in FIG. 5, the infrared light emitted by camera 12 strikes and is reflected by beacon 7 and falls on point $B_2$ of the image field 18 of the camera 12, as represented in FIG. 5. The axis system U,V represented therein is horizontal and fixed to vehicle 1, with the V-axis extending in the driving direction. By reading a single fixed row 19 which, thus, is directed along the U-direction and transversely of the driving direction which, for example, corresponds with the most central row of the image field, the number of columns E is measured between point $B_2$ and the most central column of image field 18, coinciding with the actual driving direction.

The angle $A_2$ between the direction of the beacon 7 and the perpendicular in the center of row 19 is calculated by the processing unit 14 according to the equation: arc tangent $(E_2.P/F_2)$, wherein P is the physical dimension of a pixel and $F_2$ the distance between the image field and the focal point of the camera 12.

Starting from this angle $A_2$ and the known height position of the beacon 7 above the path 2, the processing unit 14 calculates the difference in the U-direction of the image field 19 between the actual position $U_W$ and the desired position $U_G$.

The deviation in respect to the desired position in the driving direction is also calculated by the processing unit 14, but from the speed of the vehicle 1 and the difference in time, measured by the measuring apparatus 15. When the camera 12 during driving arrives below (or above) the aforementioned beacon 7 with known position, the calculated position can be compared with the actual one by the processing unit 14.

The processing unit 14 transmits the data relating to the deviations to the control device 4 controlling the vehicle 1.

The information from the two cameras 11 and 12 do not necessarily have to be available simultaneously. If information from one or both cameras is missing, this information can be replaced by information from measuring apparatus 15.

The processing unit 14 can take still other information into consideration and can, for example, bring in an additional fixed correction when the sensing device 10 is not exactly in the center of the vehicle 1 or if the vehicle 1 has to direct itself to a point next to beacon 6.

The sensing device 10 and the part of the processing unit 14 processing the information herefrom allow one to recalibrate the sensors or such of the measuring apparatus 15 from time to time. The measuring system 5 also enables steering the vehicle 1 accurately at locations where the measuring apparatus 15 can not be used, or in the absence of this conventional measuring apparatus.

When the cameras 11 and 12 are of the "random access" type, the power of the information-processing computer of the processing unit 14 may be limited.

The present invention is in no way limited to the forms of embodiment described herein represented in the Figures, but rather the measuring system and sensing device according to the invention can be realized in various variants without departing from the scope of the invention.

For example, the directions of the two cameras 11 and 12 are not necessarily exactly perpendicular to each other. They may form an angle with each other of, for example, 97°.

We claim:

1. A measuring system for detecting the actual position and driving direction of a computer guided vehicle relative to a desired position and driving direction for the vehicle along a predetermined desired path of travel for the vehicle, comprising:

a plurality of first optical beacons located and orientated adjacent the path of travel of the vehicle such that they will be observable in a first viewing direction from said vehicle while said vehicle is moving approximately along said desired path of travel;

a plurality of second optical beacons located above or in the plane of travel of the vehicle and along the desired travel path, said second beacons oriented such that they will be observable in a second viewing direction from said vehicle while said vehicle is moving along said desired path;

sensors on board the vehicle for optically detecting said beacons and generating signals indicative of the angular directions of said beacons relative to reference axes that are related to the desired position and direction of travel of the vehicle;

a computer for receiving said signals from said sensors and processing said signals in accordance with a program that calculates the actual position and driving direction of the vehicle relative to a desired position and driving direction of travel of the vehicle;

said sensors comprising a first camera aimed in a first viewing direction approximately along the driving direction of the vehicle and a second camera directed in a second viewing direction extending perpendicular to the plane of the vehicle travel path, said cameras including optical systems adapted to view and image the location of said beacons.

2. The measuring system according to claim 1, including a separate guide system for the vehicle including a second vehicle actual position and driving direction measuring system.

3. The measuring system according to claim 1, wherein said cameras are electronic random access type cameras.

4. The measuring system according to claim 1, wherein said beacons comprise planar reflectors.

5. The measuring system according to claim 1, wherein a light projector is separately associated with each of said cameras and projects light rays to illuminate said beacons and to which the sensor of each camera is uniquely responsive.

6. The measuring system according to claim 1, including a housing for enclosing said cameras, said housing being transparent to the light projected by said light projectors at least along the line of sight of said cameras.

7. The measuring system according to claim 1, wherein said cameras are oriented to view along directions that are approximately perpendicular to each other.

* * * * *